Sept. 20, 1966      P. E. WILLMAN      3,273,267
WATER LEVEL INDICATOR FOR ELECTRIC IRON
Filed Oct. 22, 1965
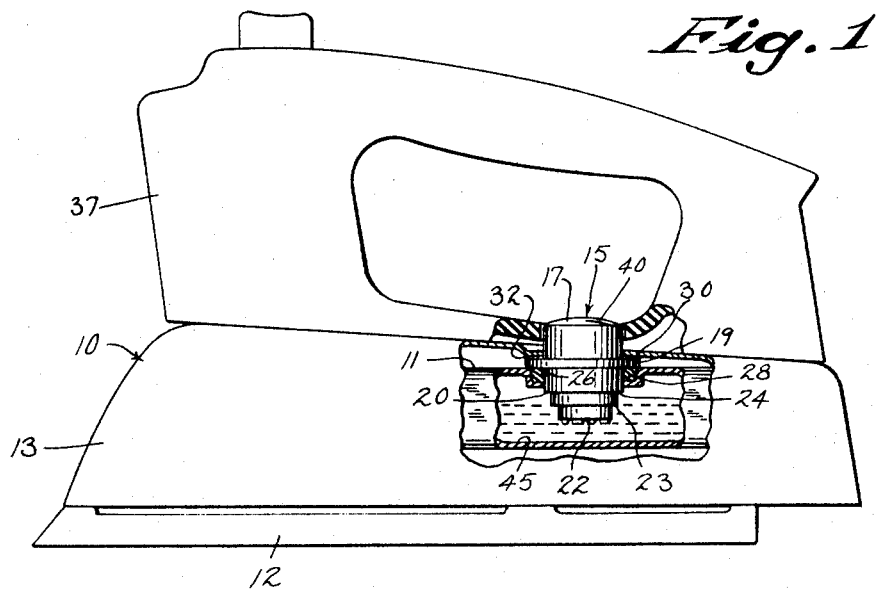
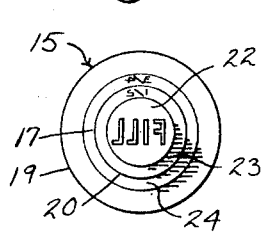
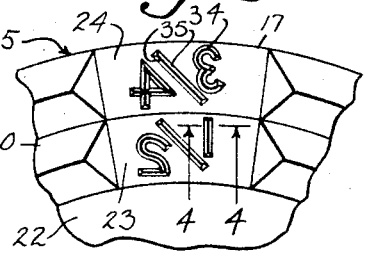
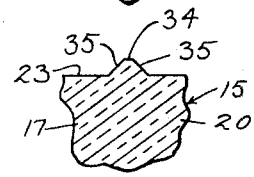
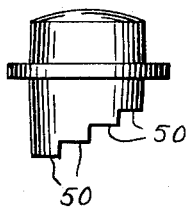
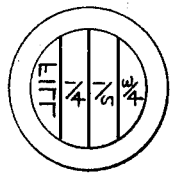
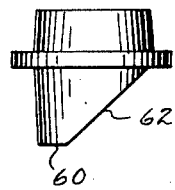
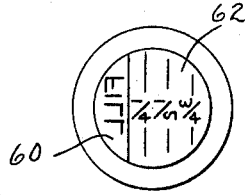
INVENTOR
PHILIP E. WILLMAN
BY *Robert W. Ratcliffe*
ATTORNEY

United States Patent Office 3,273,267
Patented Sept. 20, 1966

3,273,267
WATER LEVEL INDICATOR FOR ELECTRIC IRON
Philip E. Willman, St. Charles, Ill., assignor to McGraw-Edison Company, Milwaukee, Wis., a corporation of Delaware
Filed Oct. 22, 1965, Ser. No. 501,438
1 Claim. (Cl. 38—77)

The present invention relates to electric irons and more particularly to a liquid level indicating device for such irons having a liquid reservoir such as provided to supply water to steam or spray devices.

In commercial applications of irons equipped to provide steam or liquid spray during use, a reservoir is provided that is concealed by the housing above the sole plate or the handle in combination with the housing. During use it is not only convenient that the amount of liquid remaining in the reservoir be known, but in some instances such as when the water is exhausted from the reservoir when steam ironing, the resulting dry condition may cause damage to the fabric. It would accordingly be most desirable to have a visual indication of the approaching need for refilling the reservoir that functions when the iron is in the normal operating position.

In the liquid level indicating structure of the present invention a gauge body of transparent light transmitting material is utilized to provide varying indications as to the content of the reservoir by means of embossments disposed at different levels which are visible when disposed above the surface of the water level. The only access for light to the reservoir is through the gauge body. When the legend is disposed below the surface of liquid in the reservoir light transmitted downwardly through the gauge body is refracted into the liquid with the result that the legend is darkened and substantially non-visible. When, however, the embossed legend is disposed above the liquid surface light is directed upwardly through the valve body from the embossed surfaces to effectively illuminate the legend and cause it to be readily visible.

It is an object of this invention to provide a liquid level gauge for an electric iron having a concealed liquid reservoir.

It is a further object of this invention to provide a liquid level indicating device which is effective to indicate the liquid level in the operating position so that the user need not interrupt use of the iron to determine the relative content of the water reservoir.

These and other objects and advantages of this invention will become apparent from the following description taken in connection with the accompanying drawings, wherein:

FIGURE 1 is a schematic side elevation partly broken away and partly in section showing the water level indicator of this invention;

FIGURE 2 is a top view of the body of the liquid level gauge of FIGURE 1;

FIGURE 3 is an enlarged bottom view of a portion of the ledge surfaces of the gauge body member of FIGURE 2 showing the legends embossed thereon;

FIGURE 4 is a section view taken along line 4—4 of FIGURE 3;

FIGURE 5 is an elevation of an alternative embodiment of the gauge body;

FIGURE 6 is a bottom view of the gauge body of FIGURE 5;

FIGURE 7 is an elevation view of a second alternative embodiment of the gauge body; and FIGURE 8 is a bottom view of the gauge body of FIGURE 7.

Referring to the drawings FIGURE 1 shows a schematic side elevation of an electric iron 10 having a water reservoir 11 that provides a water supply for a steam or spray device which is not shown. The reservoir 11 is mounted above the sole plate 12 and within the housing shell 13 in the normal manner which causes the housing to conceal the reservoir from the user.

The liquid level indicating device 15 of this invention includes a gauge body 17 formed of light transmitting material such as glass or plastic. The gauge body is a solid piece of material with an annular flange 19 to facilitate mounting. A lower gauge body portion 20 extends into the reservoir 11 through an aperture in the top wall and terminates in a downwardly facing bottom surface 22 with a plurality of ledge surfaces 23, 24 intermediate the bottom surface and the reservoir wall. A silicon rubber gasket 26 is received in the debossed wall portion 28 of the reservoir and is compressed between the flange 19 and the reservoir wall margining the opening to effect a water tight seal between the gauge body flange 19 and the reservoir wall 11. The housing wall includes an opening through which is received the upper portion of the gauge body 17 with the housing wall adjoining the opening debossed to form a surface 30 margining the opening substantially parallel to the reservoir top wall. The wall surface 30 margining the opening engages the upper surface of the gauge body flange 19 to secure the gauge body 17 in position by compressing the flange against the reservoir top wall with the gasket 26 therebetween. To prevent damage to the gauge body if the same is made of a material that is sensitive to heat an asbestos gasket 32 is provided between the housing wall portion margining the opening and the flange 19 to protect the gauge body from any possible elevated temperature that might occur by conduction of heat through the housing if the iron is operated for prolonged periods at an elevated temperature. As seen in FIGURES 2, 3 and 4 the lower surface 22 and ledges 23, 24 have legends embossed thereon indicating the liquid level or the need for filling the reservoir. The embossments are formed as an integral part of the gauge body 17 with a trapezoidal section as seen in FIGURE 4 providing a raised flat surface 34 and inclined surfaces 35 extending away to the surface from which the legend projects. When a legend embossed on a portion of the valve body is disposed below the surface of the liquid the light transmitted downward through the gauge body is refracted downward into the liquid from the submerged portions of the surfaces causing the area to be darkened, rendering the legend substantially non-visible. When the embossed surfaces forming the legends are above the level of the liquid light passing down through the gauge body is reflected from the various inclined surfaces and then upwardly through the gauge body causing the embossed legends to be illuminated and readily visible. To improve the contrast between the conditions of illumination when the liquid level is above or below the bottom surface or the ledge surfaces 23, 24 the reservoir bottom surface 45 confronting the gauge body may be darkened.

The iron handle 37 has beneath the grasp portion an aperture which is aligned with the openings in the reservoir and housing and to or through which the upper terminal portion of the gauge body extends. The gauge body 17 has an upper surface 40 which is smooth to permit ready viewing of a lower surface therethrough. By providing a convex upper surface 40 on the gauge body 17 the various legends underlying the upper surface are magnified to make them more readily observable to the user.

FIGURES 5 and 6 illustrate an alternative embodiment wherein the lower portion of the gauge body is modified to present a series of stepped horizontal surfaces 50 on which legends are embossed as shown schematically in FIGURE 6. FIGURES 7 and 8 illustrate a second alternative embodiment wherein the lower portion of the gauge body is modified with a single lowermost horizontal ledge surface 60 and an inclined surface 62 extending therefrom to the flange. In this embodiment a sequence of lines and legends can be provided to indicate the relative volume of various liquid levels between the ledge and flange surfaces which appear as the edge of a darkened area caused by the immersed portion where light is refracted into the liquid with the portion exposed above the liquid level illuminated by light reflected from the non-immersed surface.

While the specific embodiments of the instant invention have been shown and described herein, it is to be understood that further variations may be made without departing from the spirit and scope of the invention as defined in the appended claim.

What is claimed is:

An electric iron comprising a liquid reservoir including top and bottom wall portions; a shell structure defining a housing for said reservoir concealing the reservoir from the user; an opening in said reservoir top wall; an opening in said housing substantially aligned with said reservoir top wall opening; a visual type liquid level indicator having a body member of solid transparent light transmitting material mounted at said reservoir opening and extending into said reservoir with a lower surface disposed in a lower portion of said reservoir, a plurality of ledge surfaces respectively vertically spaced intermediate said lower surface and said reservoir top wall; legends formed in relief on said lower surface and said ledge surfaces; a darkened surface on said reservoir bottom wall confronting said body member, and a convex upper surface on said body member through which said lower surface and said ledge surfaces are viewed enlarged, whereby each of said legends are readily visible through said body member upper surface and said housing opening when said liquid level is below the surface of said body with which each legend is respectively associated and said legends are respectively not readily visible when the respective surface with which each is associated is below the surface of the liquid in said reservoir.

References Cited by the Examiner

UNITED STATES PATENTS

| | | | |
|---|---|---|---|
| 2,368,705 | 2/1945 | Du Pont et al. | 73—327 |
| 2,615,337 | 10/1952 | Maybach | 73—327 |
| 2,825,986 | 3/1958 | Pavlic | 38—77 |
| 2,943,530 | 7/1960 | Nagel | 73—327 X |
| 3,075,309 | 1/1963 | Seyfried et al. | 38—77 |
| 3,123,971 | 3/1964 | Atwood et al. | 73—327 X |
| 3,193,954 | 7/1965 | Robison | 38—77 |

FOREIGN PATENTS 1,051,370   1/1954   France.

JORDAN FRANKLIN, *Primary Examiner.*

PATRICK D. LAWSON, *Examiner.*